(No Model.)

W. H. LAMSON.
CUTTER HEAD.

No. 381,799. Patented Apr. 24, 1888.

Witnesses:
Frank Blanchard
Howard B Hallett

Inventor:
William H Lamson.
By E. J. Hill
Attorney

UNITED STATES PATENT OFFICE.

WILLIAM H. LAMSON, OF CHICAGO, ILLINOIS.

CUTTER-HEAD.

SPECIFICATION forming part of Letters Patent No. 381,799, dated April 24, 1888.

Application filed March 12, 1887. Serial No. 230,671. (No model.)

*To all whom it may concern:*

Be it known that I, WILLIAM H. LAMSON, a citizen of the United States, residing in the city of Chicago, in the county of Cook and State of Illinois, have invented a new and useful Improvement in Cutter-Heads, of which the following is a specification.

Figure 1:
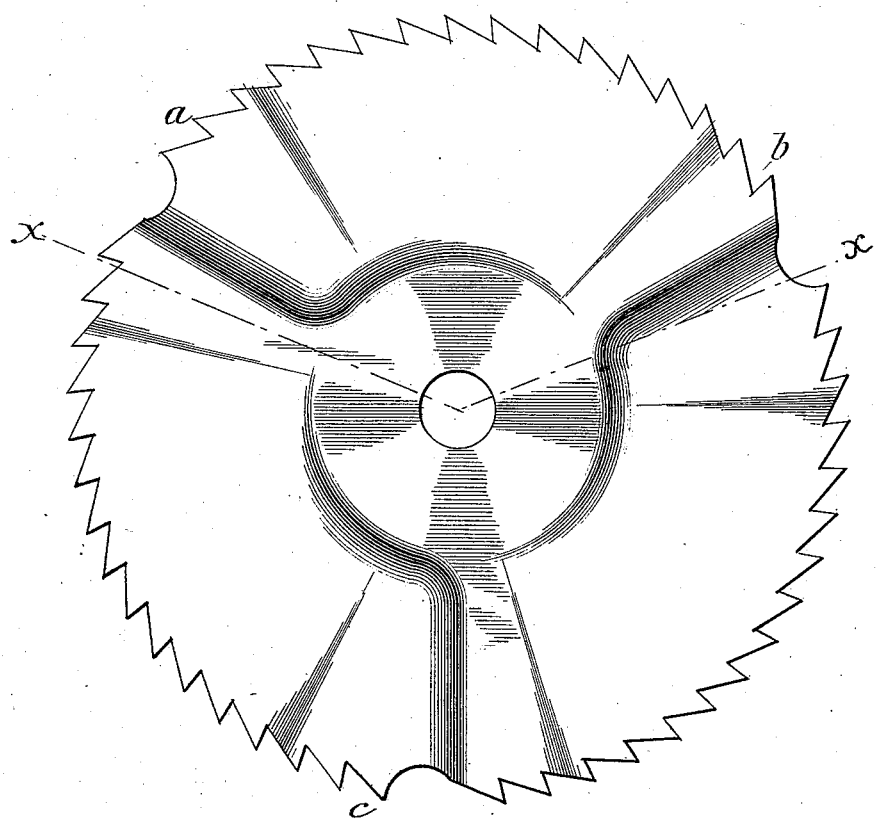
Figure 2:
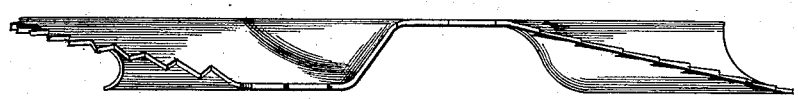
Figure 3:

My invention relates particularly to that class of circular saws that are used for the production of moldings, grooves, dadoes, and surfaces and edges; and it consists, principally, in so forming the plate that the teeth cut successively at different points, but to the same depth.
In the accompanying drawings, Figure 1 represents a side view of my saw; Fig. 2, an edge view, and Fig. 3 a sectional view through the dotted line $x$ $x$ of Fig. 1.

Referring to Fig. 1, A represents the blade, which is constructed of a single plate having three component sectors, B, each sector having a marginally-toothed edge, C. The sectors are pressed into the form of portions of spirals or screw-threads and are joined by inclined portions D of the plate, the teeth of each sector being in planes parallel to each other and perpendicular to the axis of rotation. It is not necessary, however, that the blade be made of a single piece of metal, for the same result may be obtained by connecting two or more independent spirally-warped sectors, and may also be made so as to encircle an arbor and be clamped in proper position.

Now, the saw being composed of several sectors and the toothed margin of each being of spiral form and approximately equidistant from the axis of rotation, it is clear that as the saw rotates the teeth in each sector cut to the same depth, but depart successively from the point cut by the preceding tooth, and thereby cut the full width of a groove. The first tooth of each sector cuts the side of the groove opposite to that cut by the last tooth of each sector, and the width between the extremes of these two teeth is the width of the groove.

To cut grooves of different widths, the spiral variations of the sector must be modified accordingly; but each saw-blade is not adjustable in this respect. A circular saw constructed in the manner herein shown and described is only intended to cut a groove of a given width.

Having thus described my invention, I claim—

1. For rabbeting or grooving, two or more sectors joined to form a circular saw, each of said sectors having its outer toothed margin oblique to the axis of rotation and its teeth approximately equidistant from said axis, whereby the teeth cut to the same depth but in different planes perpendicular to the axis of rotation.

2. A circular saw consisting of a single plate, the outer parts of certain of its component sectors pressed into the form of portions of spirals or screw-threads whose axes are the axis of rotation of the saw, each sector having a separate series of teeth.

3. A cutter-head consisting of a marginally-toothed plate having spirally-warped sectors connected by inclined portions of the plate, substantially as and for the purpose set forth.

4. A cutter-head whose working-edge consists of distinct series of teeth arranged obliquely to the axis of rotation and equidistant therefrom, whereby the teeth in each series cut to the same depth but in planes parallel to each other and at right angles to the axis of rotation.

WM. H. LAMSON.

Witnesses:
RICHARD W. HILL,
WARREN C. GODDARD.

(No Model.) 2 Sheets—Sheet 1.
H. LOEWENBACH & W. F. H. MATTER.
SHEET STRAIGHTENER FOR PRINTING PRESSES.
No. 381,800. Patented Apr. 24, 1888.
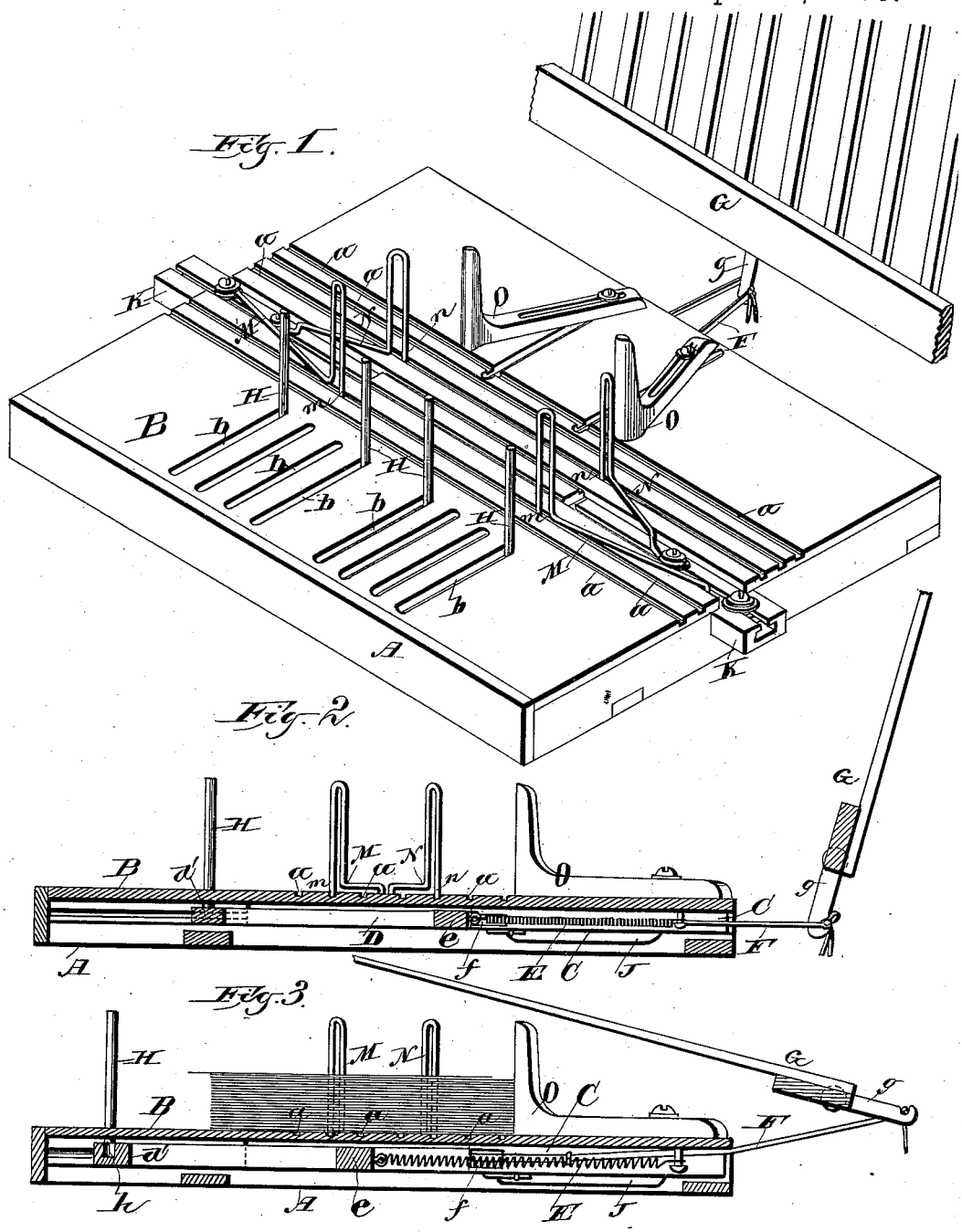
Witnesses:
E. G. Homus
N. E. Oliphant.
Inventors:
Hugo Loewenbach.
William F. H. Matter.
By Stout & Underwood,
Attorneys.